United States Patent
Jerue

[15] 3,689,988
[45] Sept. 12, 1972

[54] MACHINE TOOL WITH AUTOMATIC TOOL CHANGING MECHANISM

[72] Inventor: Richard A. Jerue, Birmingham, Mich.

[73] Assignee: Devlieg Machine Company, Royal Oak, Mich.

[22] Filed: April 22, 1970

[21] Appl. No.: 30,630

[52] U.S. Cl. .................................................29/568
[51] Int. Cl. ...........................................B23q 3/157
[58] Field of Search.........................................29/568

[56] References Cited

UNITED STATES PATENTS

| | | | |
|---|---|---|---|
| 3,414,967 | 12/1968 | Erickson | 29/568 |
| 3,300,856 | 1/1967 | Daugherty | 29/568 |
| 3,431,634 | 3/1969 | Balding | 29/568 |

FOREIGN PATENTS OR APPLICATIONS

| | | | |
|---|---|---|---|
| 1,235,705 | 3/1967 | Germany | 29/568 |

Primary Examiner—Andrew R. Juhasz
Assistant Examiner—Z. R. Bilinsky
Attorney—Harness, Dickey & Pierce

[57] ABSTRACT

An automatic tool changing machine tool in which tools are selected from a tool storage device and transported to a position adjacent the drive spindle of the machine. From this position, a selected tool is inserted automatically in the drive spindle of the machine when it is ready to be used. The tools are coupled to pallets or carriers having handles which are engaged by various tool gripping elements in transporting the tool from the storage device to the spindle. The carriers also serve to mount coding for identifying the tool and conveying certain dimensional characteristics of the tool. Each carrier remains with its tool at all times and is only rotationally uncoupled from its tool after the tool has been inserted in the drive spindle.

13 Claims, 20 Drawing Figures

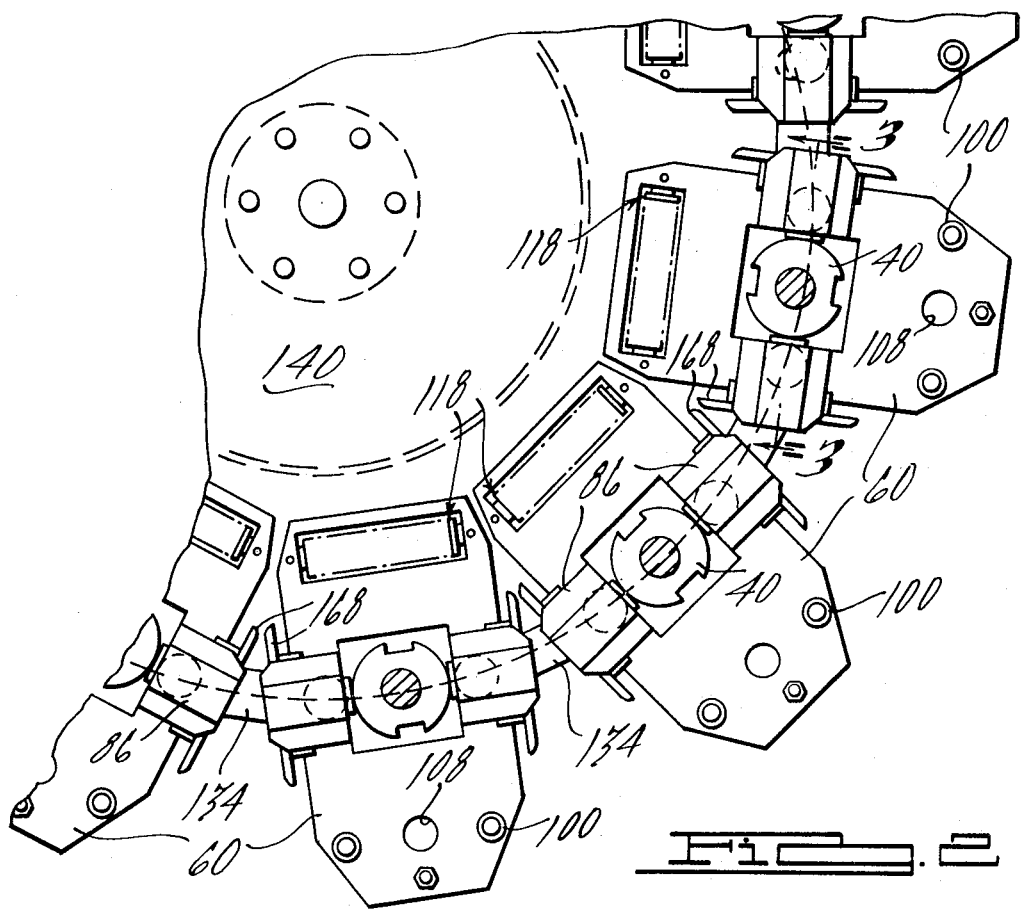
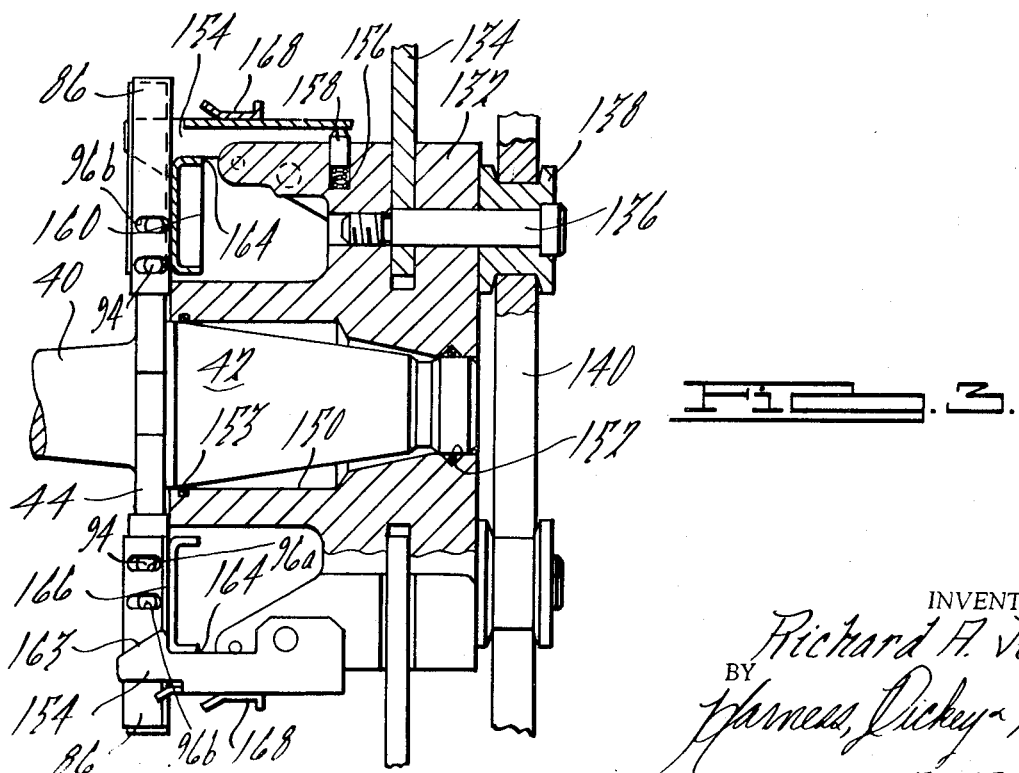

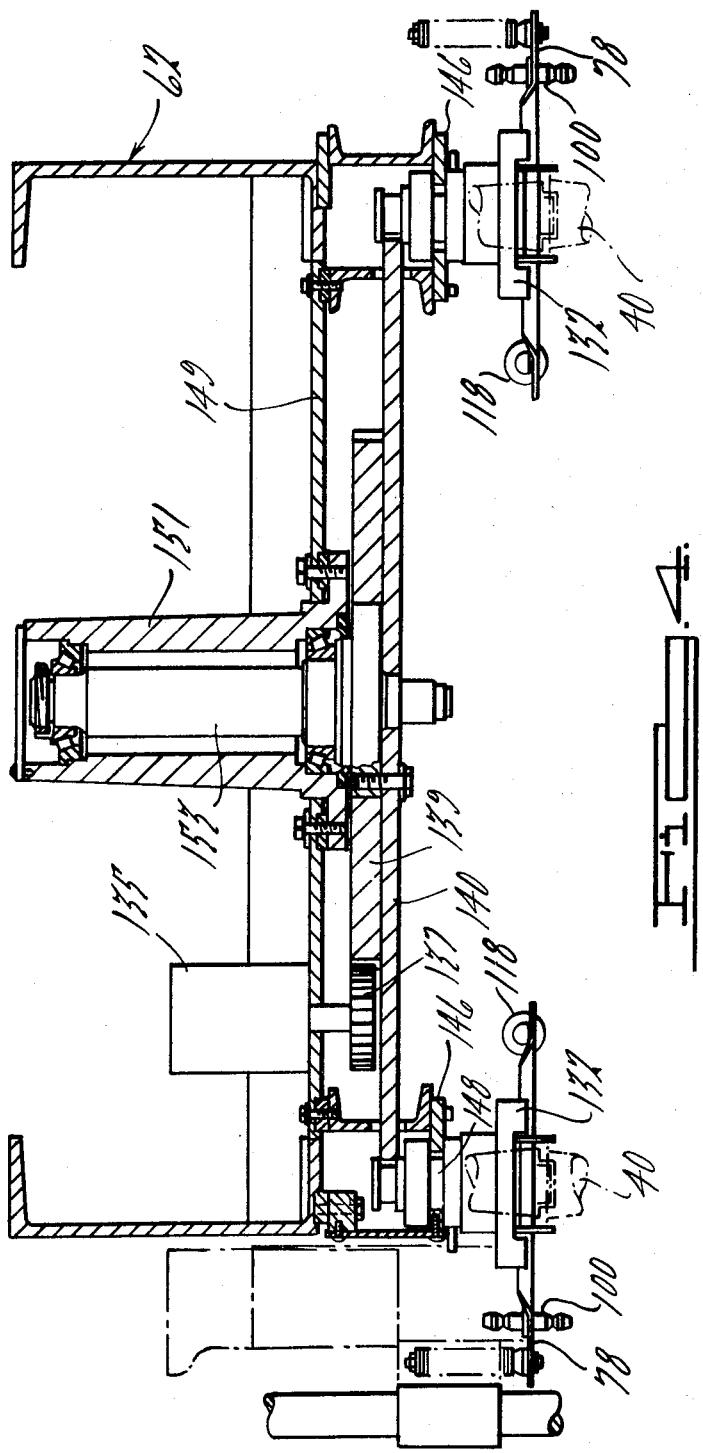

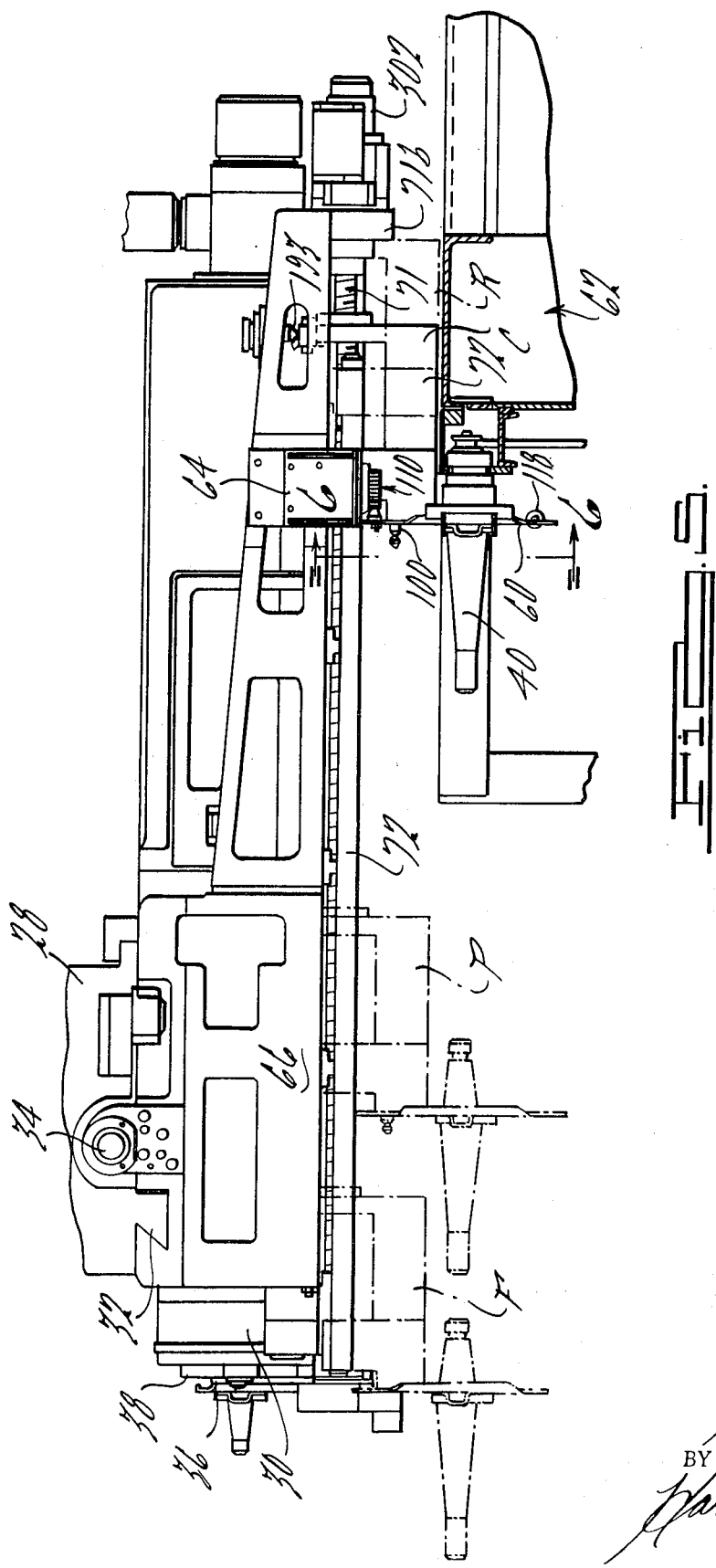

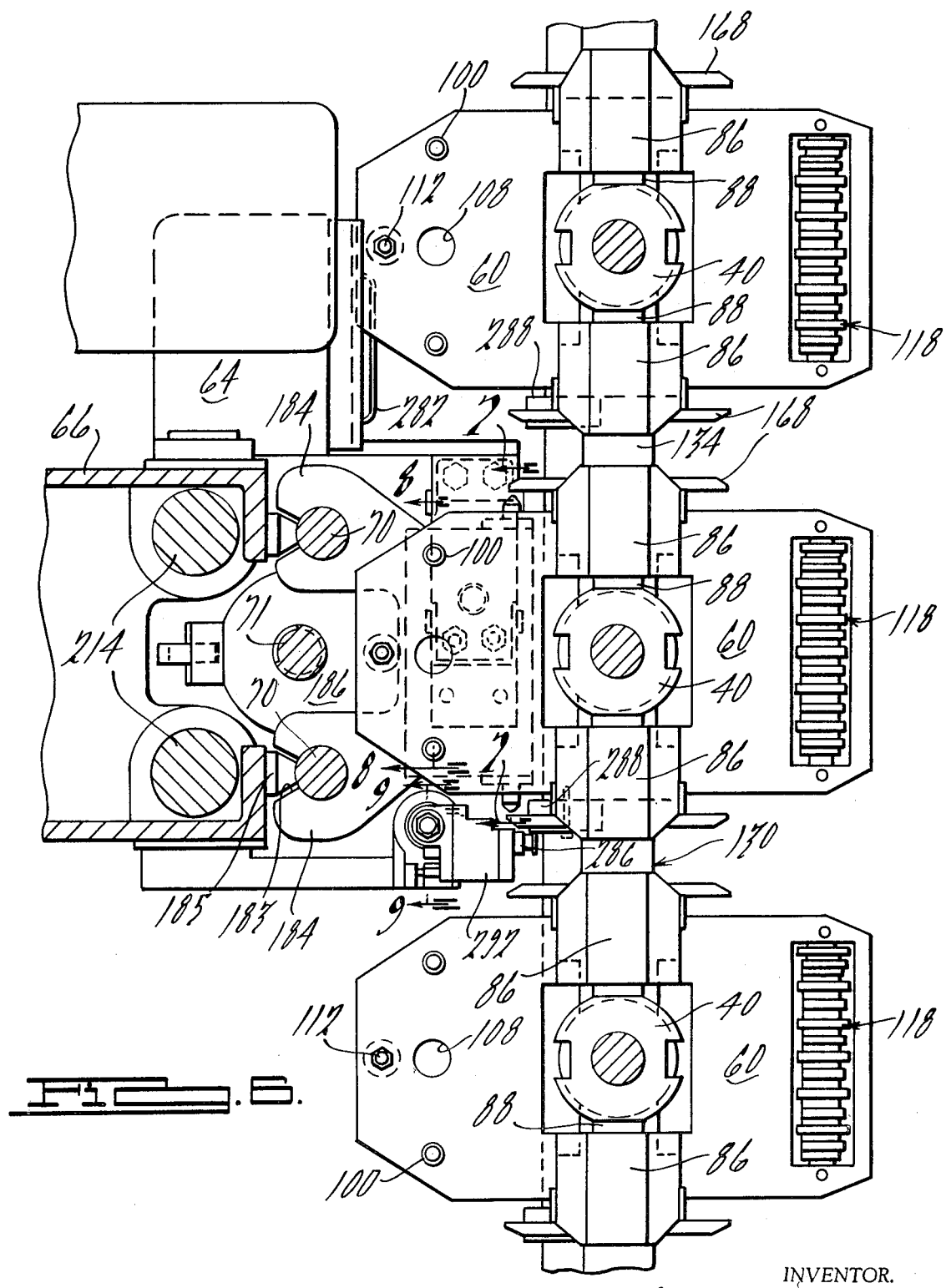

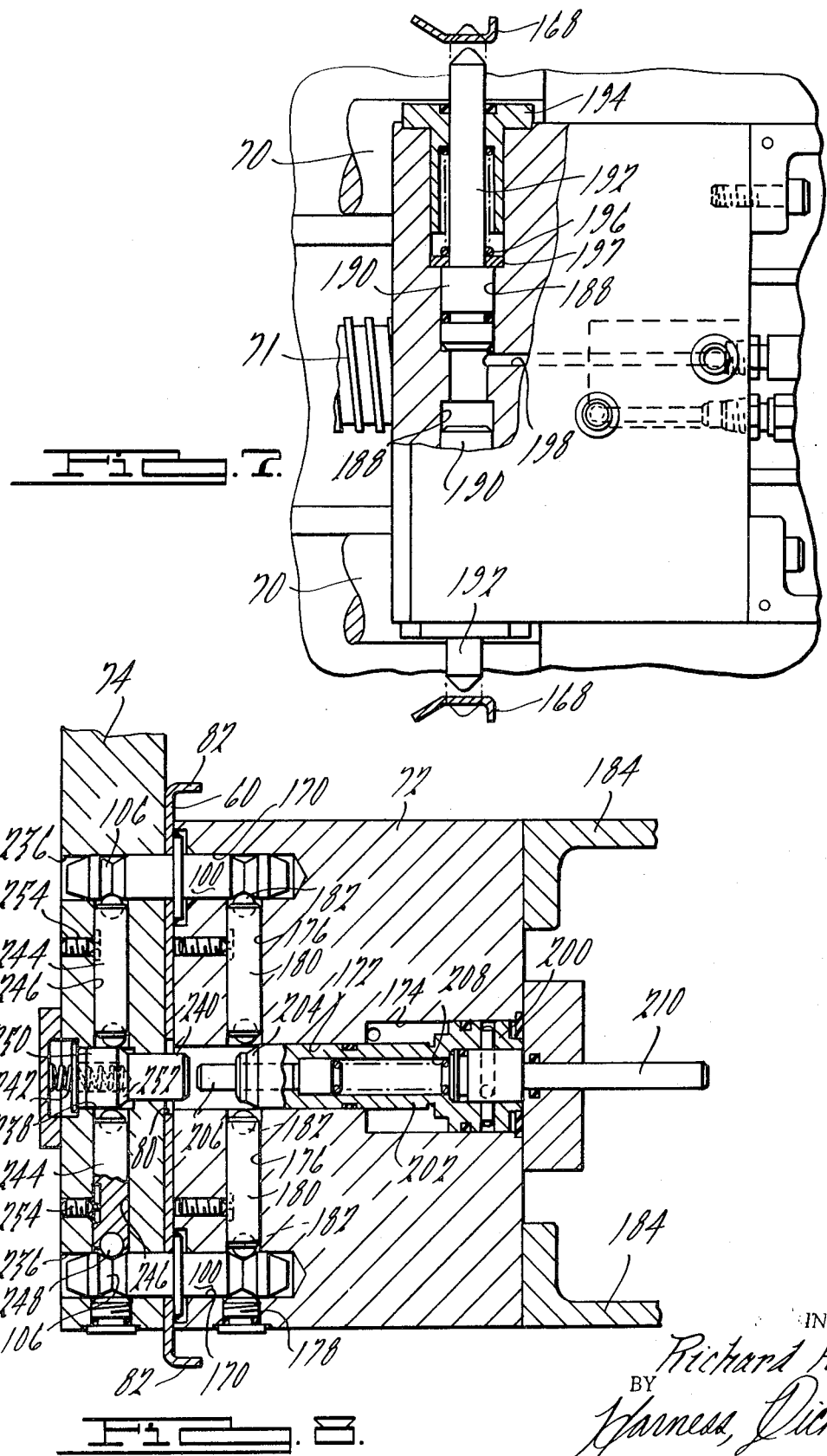

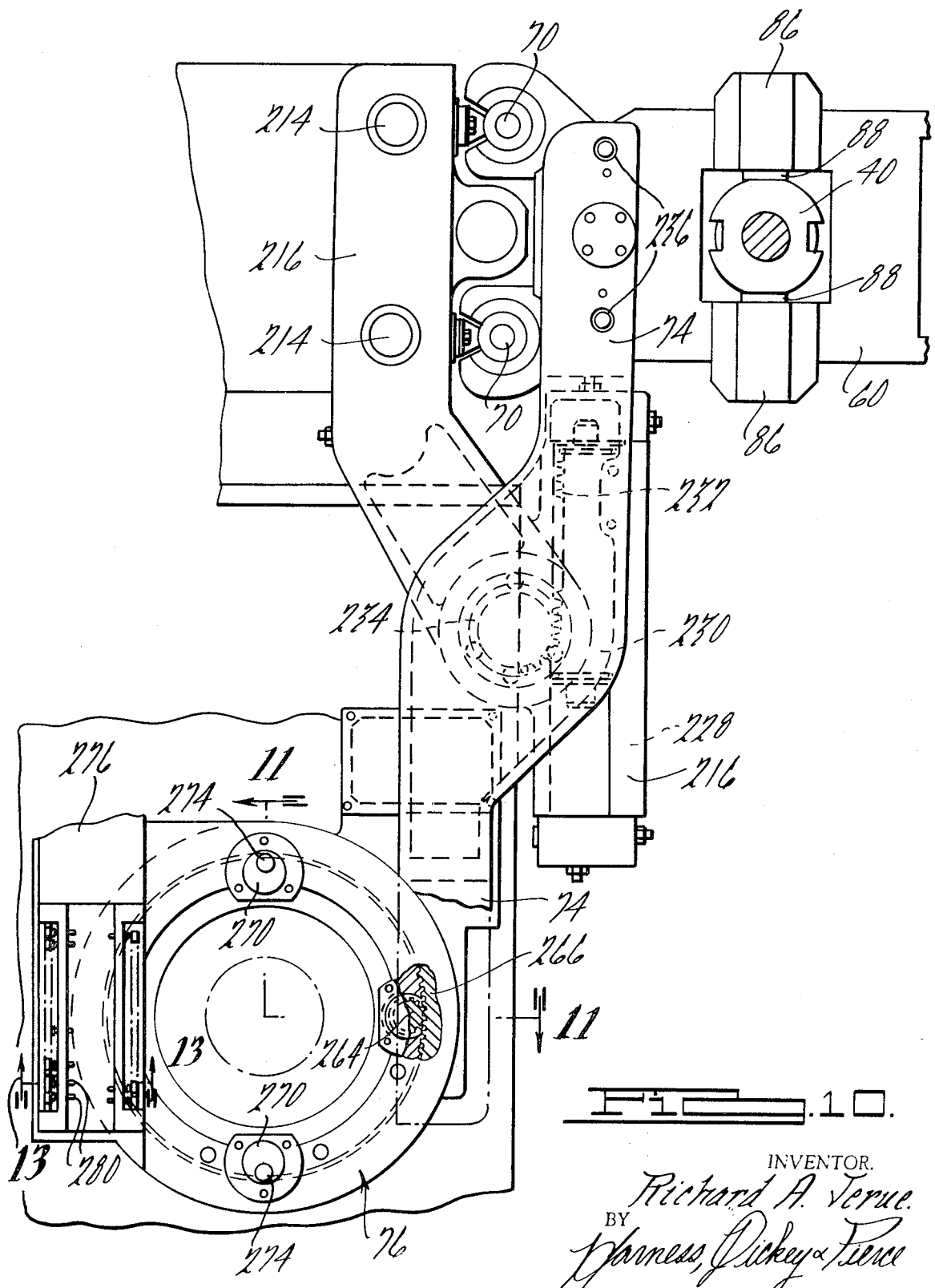

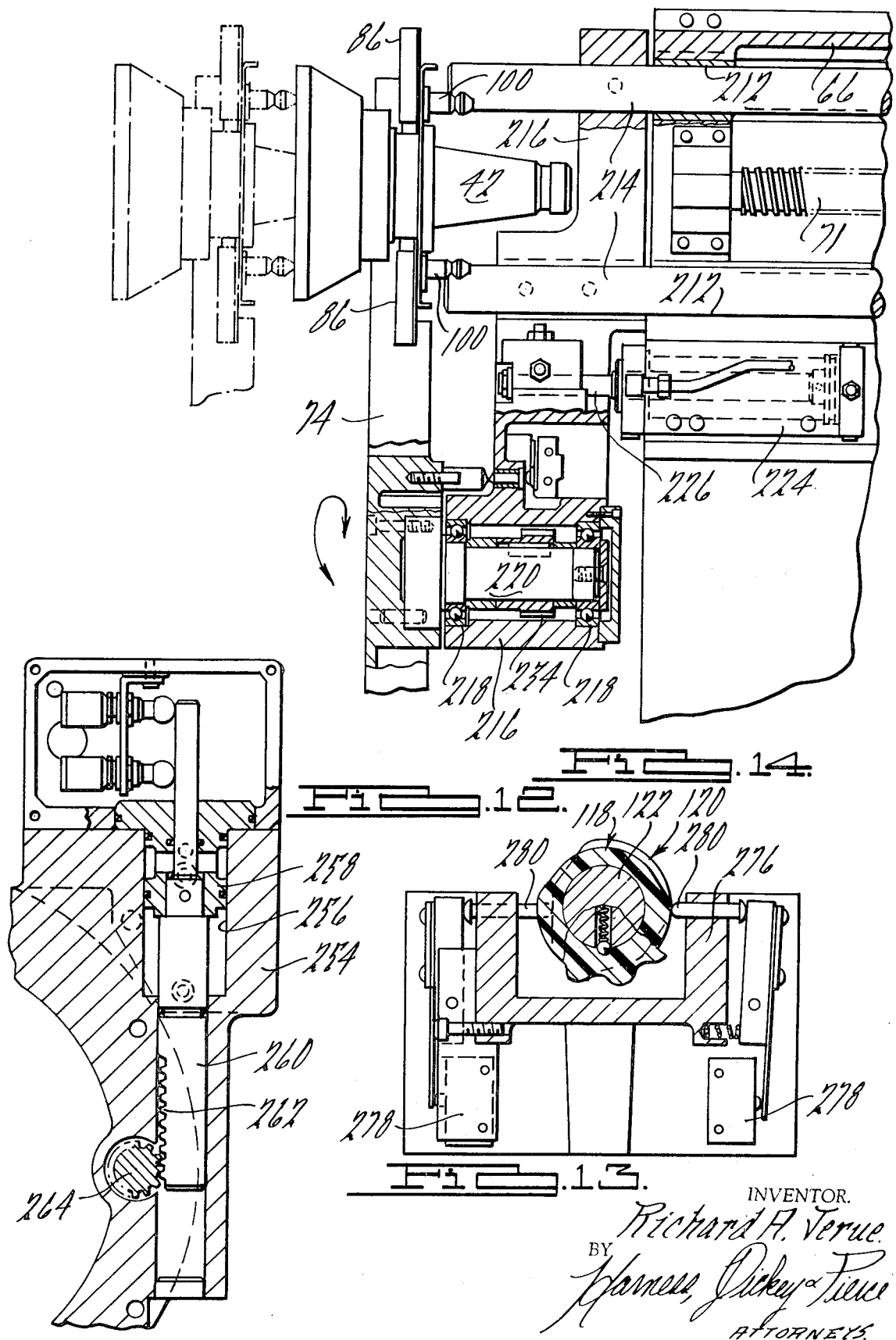

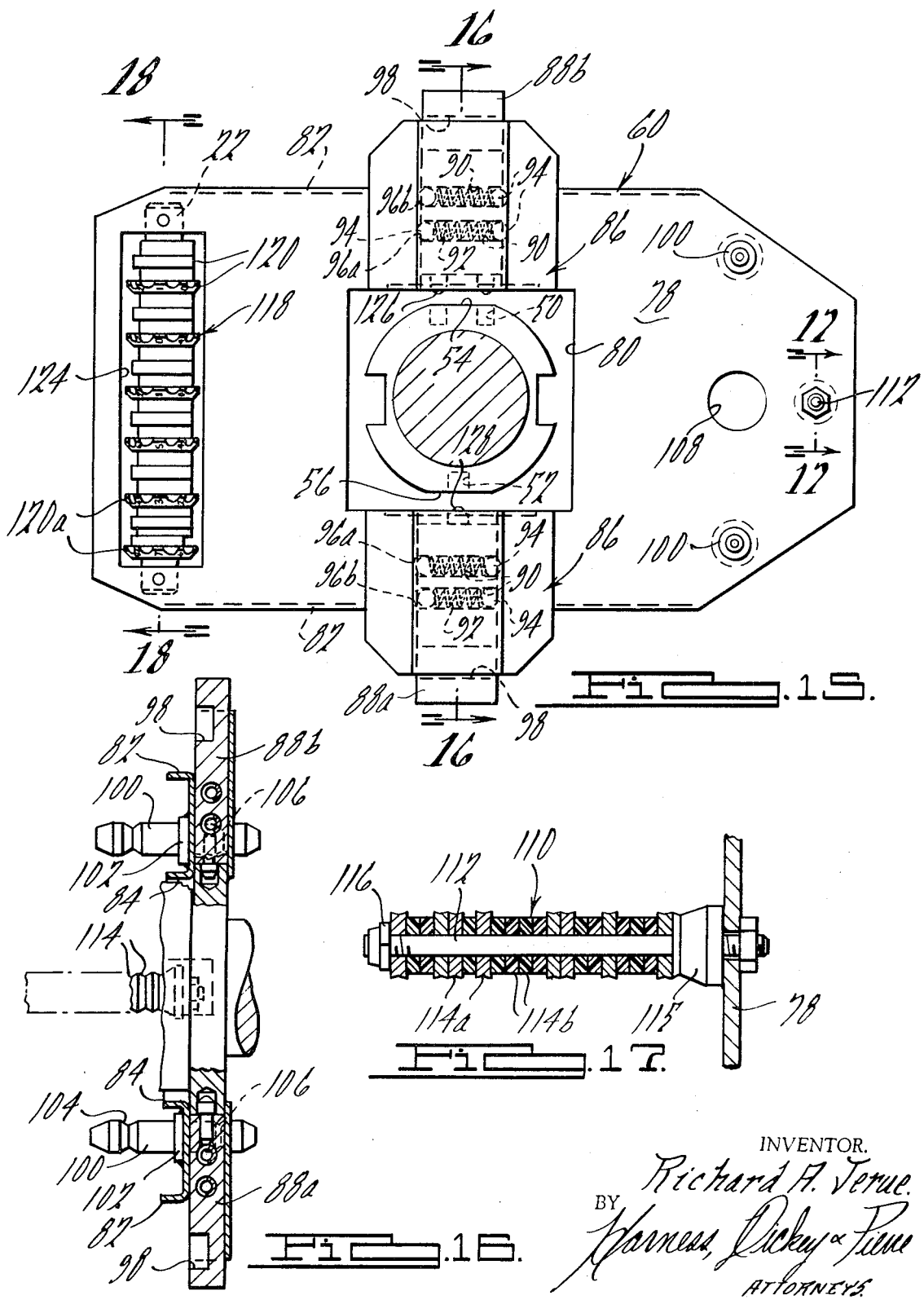

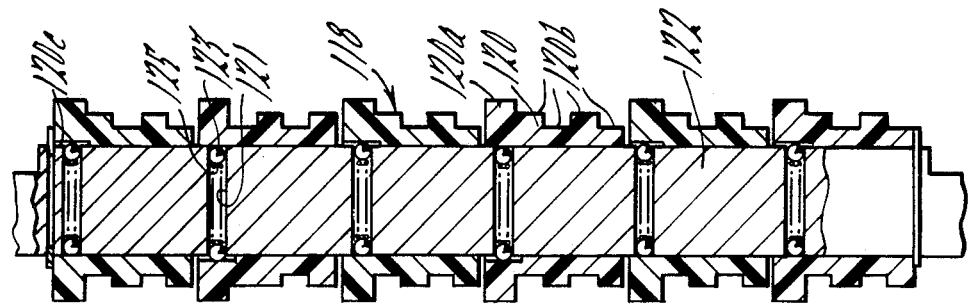
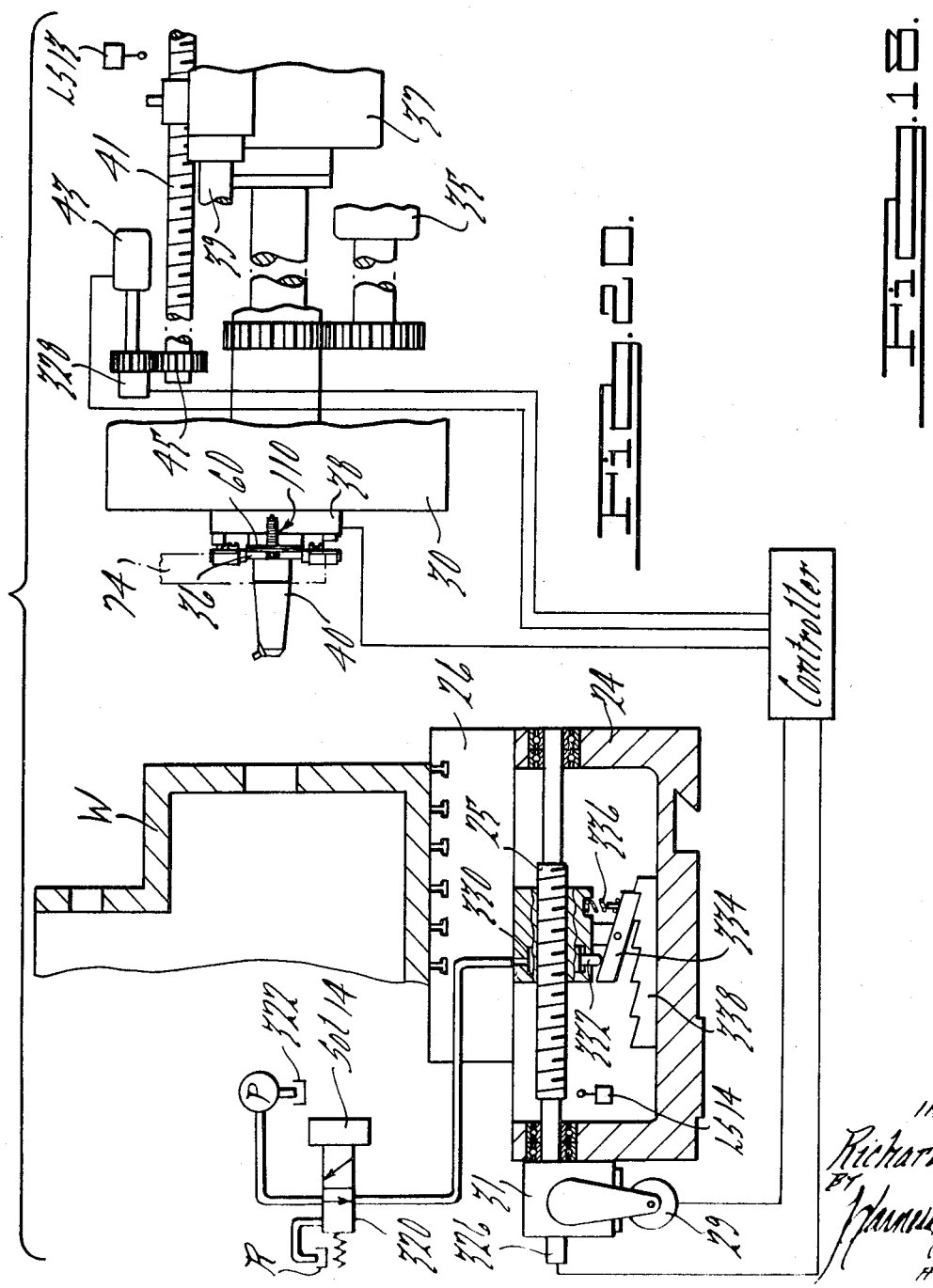

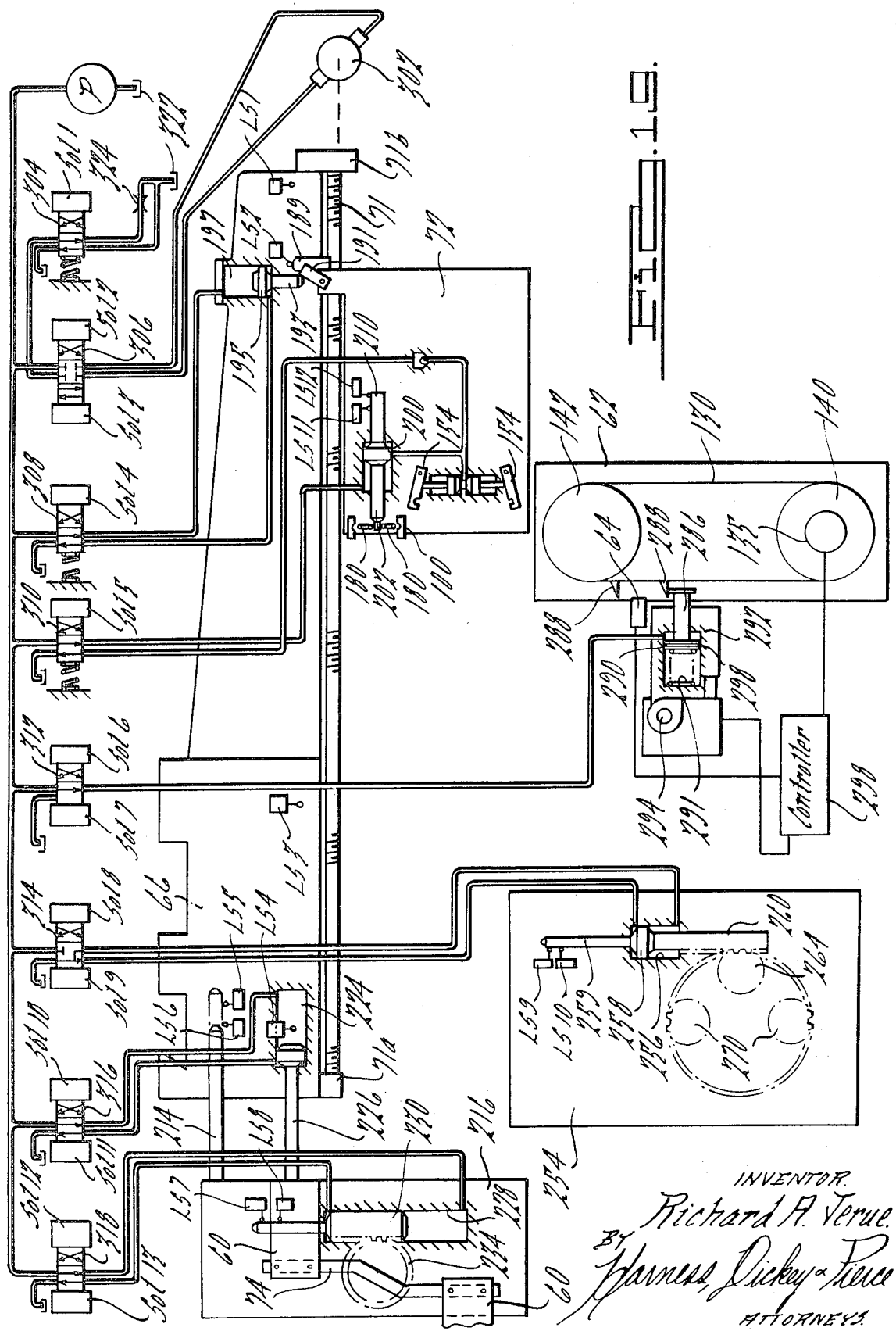

MACHINE TOOL WITH AUTOMATIC TOOL CHANGING MECHANISM

SUMMARY OF THE INVENTION

Various automatic tool changing devices have been proposed for use with boring, milling, drilling and similar machine tools. Such tool changing devices are used with machine tools having numerical control systems by which a tape, punch card or the like is programmed to control the performance of the machine through a sequence of machining operations. A workpiece is precisely mounted on the worktable of such a machine and is then subjected to a number of different machining operations, each of which may utilize a different metal cutting tool. In order to minimize the human involvement in the performance of the various machining operations, the tool changer removes each tool from the spindle after it has been used and substitutes the new tool called for the next machine operation. It is, of course, necessary to search for each new tool as it is required and to return used tools to the tool storage device. The execution of these functions have presented machine tool designers with a number of problems, which include:

1. The problem of designing the cutting tool and the cutting tool handling mechanisms to permit a tool to be passed from one gripper to another without risk of dropping the tool.
2. The problem of providing low cost, reliable identification for each tool and particularly identification which can be used with standard tooling without expensive modification of such tooling.
3. The problem of storing a large number of tools and mounting the tool changing mechanism without burdening the machine tool with a heavy weight which will impair the accuracy of the machine.
4. The problem of correlating the axial length of a tool to the information programmed into the machine, a problem which has heretofore required the use of axially adjustable tooling or excessively complex electronic equipment.
5. The problem of minimizing the time required to change tools and commence a machining operation, including the problem of coordinating the positions of the tool selection and transfer mechanism, the spindle and the tool storage device, the problem of positioning the spindle loading arm during machining, and the problem of returning the tool to the storage device.
6. The problem of selecting optimum positions for the workpiece to provide the necessary clearance when a long tool is being used while minimizing spindle "overhang" during the use of a short tool.

The machine tool and tool changer of the present invention are designed to provide solutions to each of the foregoing problems. The design centers around the uses of a separate pallet or carrier for each tool which remains with its tool and is desirably uncoupled from its tool only after the tool has been inserted into the machine spindle. The carriers have "handles" that are gripped by tool handling mechanisms and the carriers also serve as a mounting for tool identification coding and tool length coding which are read by the machine to select a desired tool, control the position of the work and regulate the axial length of tool movement. The design is distinguished by its ruggedness, simplicity, low cost, reliability, flexibility of usage and its compatibility with the requirements of both high precision machining and high speed automation.

DESCRIPTION OF THE VIEWS OF THE DRAWINGS

FIG. 2 is an enlarged elevational view of a portion of the structure of FIG. 1 looking in the direction of the arrow 2 thereof;

FIG. 3 is a view partly in section of the structure illustrated in FIG. 2 taken along the line 3—3 thereof;

FIG. 4 is an enlarged sectional view of the structure illustrated in FIG. 1 taken along the line 4—4 thereof;

FIG. 5 is an enlarged view partly in section of the structure shown in FIG. 1, looking in the direction of the arrow 5 thereof;

FIG. 6 is an enlarged sectional view of the structure illustrated in FIG. 5 taken along the line 6—6 thereof;

FIG. 7 is a sectional view of the structure illustrated in FIG. 6 taken along the line 7—7 thereof;

FIG. 8 is a sectional view of the structure illustrated in FIG. 6 taken along the line 8—8 thereof;

FIG. 10 is an enlarged view with parts broken away of a portion of the structure illustrated in FIG. 1 looking in the direction of the arrow 10 thereof;

FIG. 12 is a sectional view of the structure illustrated in FIG. 11 taken along the line 12—12 thereof;

FIG. 13 is a sectional view of the structure illustrated in FIG. 10 taken along the line 13—13 thereof;

FIG. 14 is a side elevational view partly in section of the structure shown in FIG. 10;

FIG. 15 is a plan view, partly in section, of one of the tools and its carrier shown in the preceding views;

FIG. 16 is a sectional view of the structure shown in FIG. 15 taken along the line 16—16 thereof;

FIG. 17 is an enlarged sectional view of the structure shown in FIG. 15, taken along the line 17—17 thereof;

FIG. 18 is an enlarged sectional view of the structure shown in FIG. 15 taken along the line 18—18 thereof; and FIGS. 19 and 20 are schematic views of various mechanical, electrical and hydraulic components of the machine shown in FIGS. 1-18.

DESCRIPTION OF THE ILLUSTRATED EMBODIMENT

Figure 1:
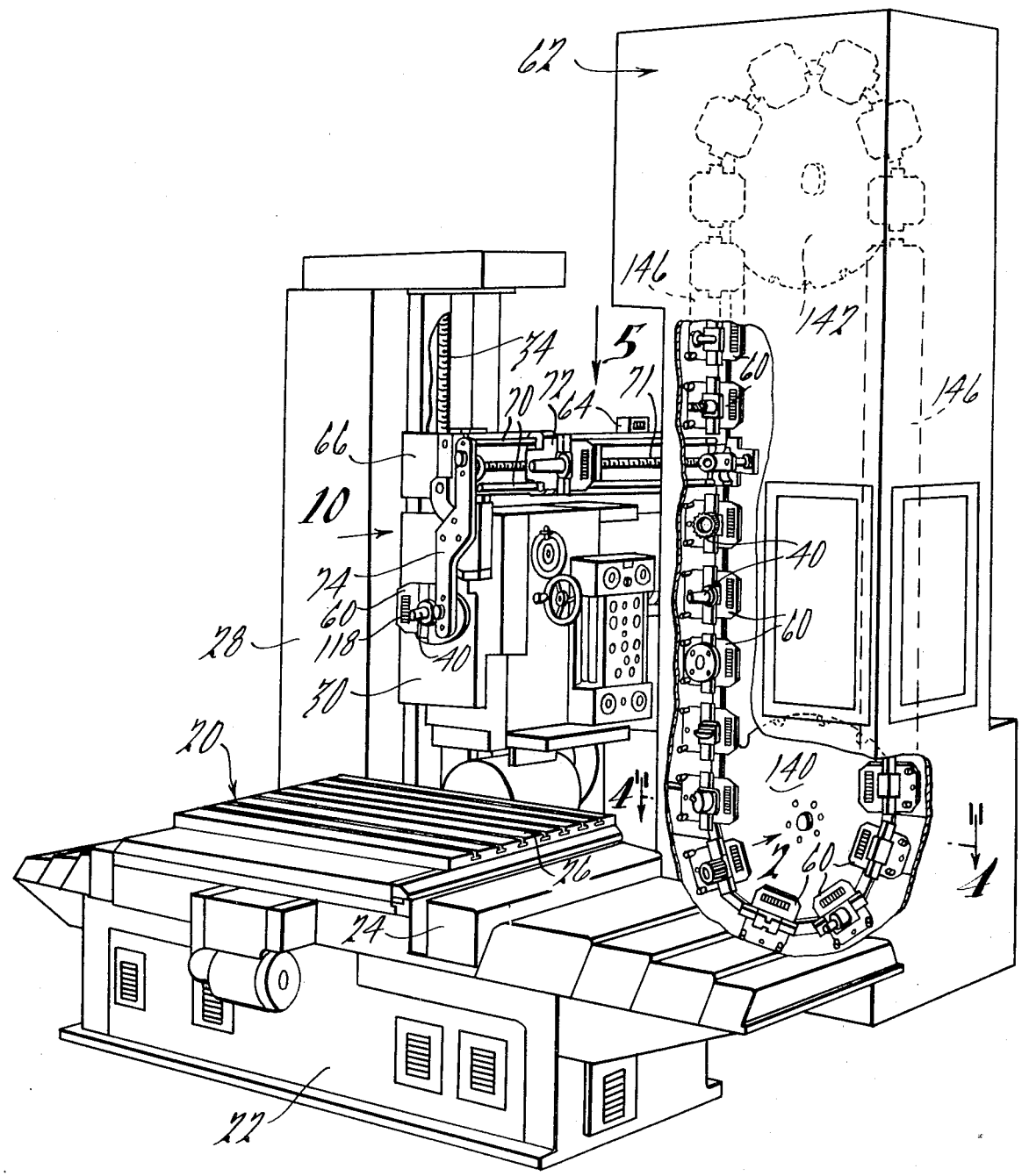
FIG. 1 is a perspective view with parts broken away of a machine tool having a tool changing mechanism constructed in accordance with the present invention.
Figure 9:
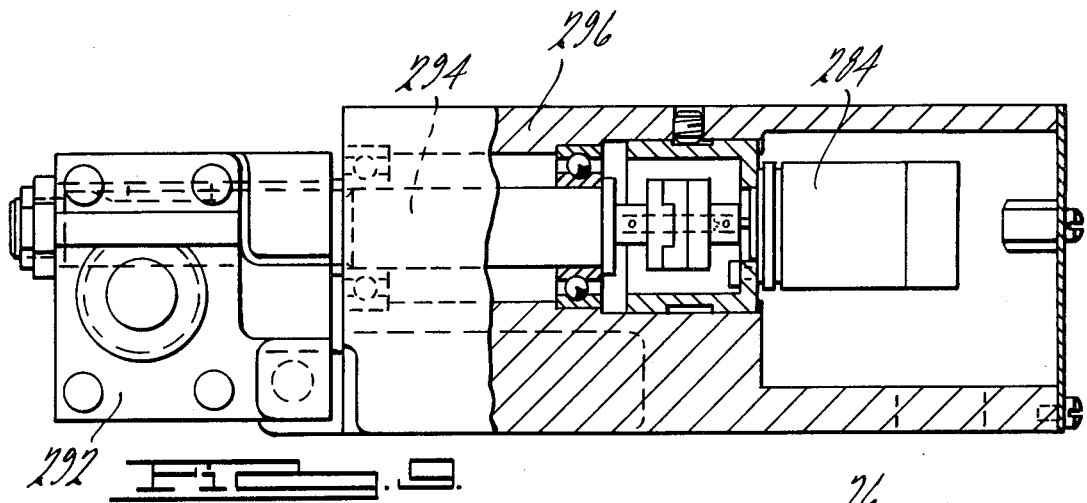
FIG. 9 is a sectional view of the structure illustrated in FIG. 6 taken along the line 9—9 thereof.

FIG. 1 shows a machine tool 20 of the type commonly known as a horizontal boring and milling machine. The machine 20 includes a cast base 22 on which is positioned a saddle 24 and a worktable 26. The saddle 24 is movable along a given axis on the base 22 while the table 26 is movable on the saddle in a direction perpendicular to the axis of movement of the saddle. This latter movement is accomplished by a table lead screw 25 (FIG. 20) driven by an electric motor 29 working through a gear reducer 31. A column 28 extends upwardly from the base 22 at one side of the table 26. The column 28 is provided with ways 32 (FIG. 5) which guide a spindle head 30 for vertical movement under the influence of a vertical lead screw 34. A drive spindle 36 is supported by the spindle head 30 for rotation and for axial movement toward and away from the work. The axis of the spindle 36 is parallel to the axis of movement of the table 26 on the saddle 24. The drive spindle 36 has a splined fit within an axially stationary spindle sleeve 38 through which the rotary drive force is transmitted from a motor 35 (FIG. 20). As shown in FIG. 20, the drive spindle 36 is fed axially through the spindle sleeve 38 by a thrust housing 37. The thrust housing 37 slides on bars 39 under the influence of a lead screw 41. The lead screw 41 is turned by a motor 43 through intermediate gearing 45.

The tools which are designed to be used with the machine of the present invention are designated by the numeral 40. The forward or working ends of the tools 40 are of varying types. For example, the tools 40 may comprise milling cutters, drills, boring tools, etc. However, all of the tools 40 incorporate a tapered shank 42 (FIG. 3) which extends rearwardly from a flange 44 having oppositely disposed keyways 46. The keyways 46 are received within drive keys 48 of the spindle 36. The flange 44 is provided with a pair of circumferentially spaced holes 50 extending inwardly from one side thereof and a single hole 52 extending inwardly from the diametrically opposite side of the periphery of the flange. The holes 50 and 52 extend inwardly from flat surfaces 54 and 56, respectively, formed on the outer periphery of the flange 44. The tools 40 are identical to the tools described and claimed in my prior U.S. Pat. No. 3,327,386 of June 27, 1967.

The construction of the machine of the present invention is particularly distinguished by the fact that each tool 40 is carried by and has its own associated pallet or carrier 60. Each pallet 60 serves several functions, including the provisions of grippable means for passing the tool from one tool handling mechanism to another. The pallet 60 also serves as a mounting location for tool identifying or other coding means.

Figure 11:
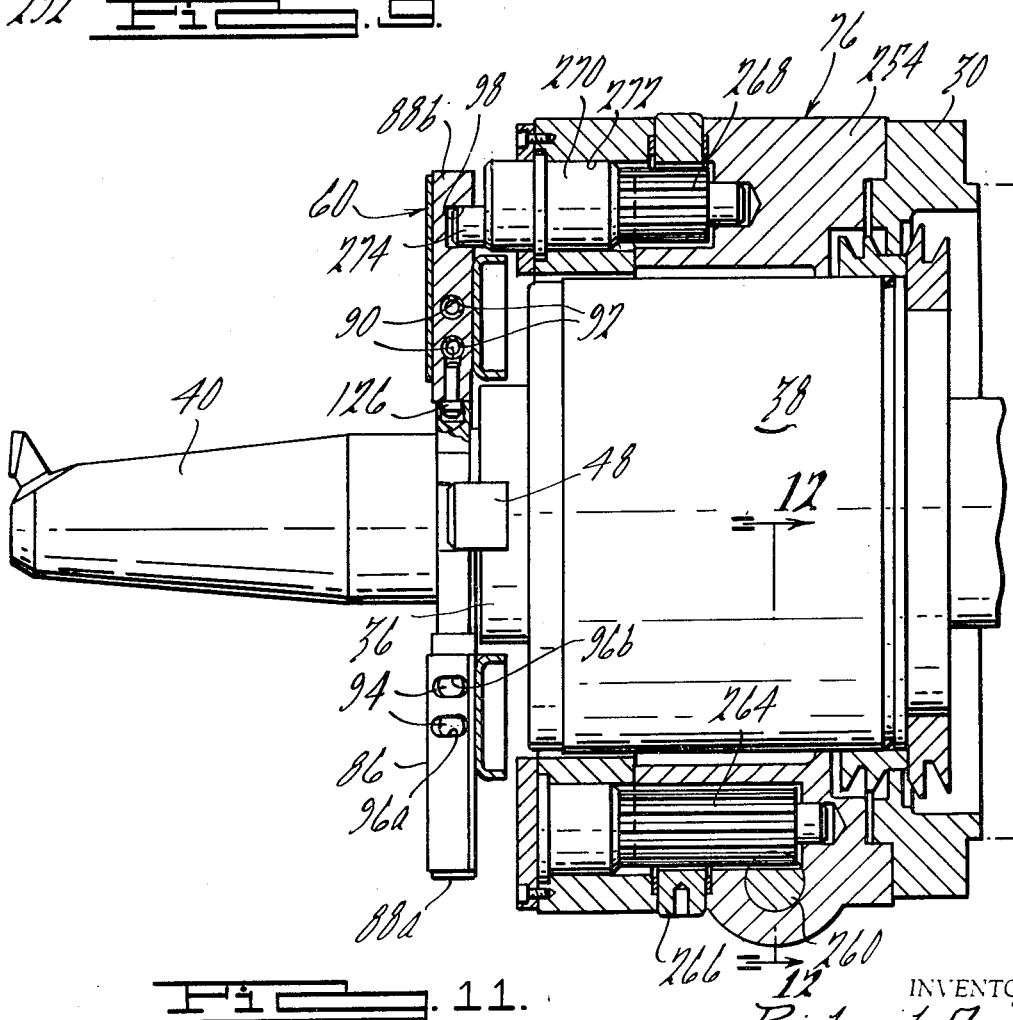
FIG. 11 is a sectional view of the structure illustrated in FIG. 10 taken along the line 11—11 thereof, the parts deleted in FIG. 10 being shown.

A plurality of tool-pallet (40–60) combinations are carried by and stored in a tool storage device, which is identified generally by the numeral 62. The tools and their pallets are so mounted within the tool storage device 62 as to be successively presented to a reader 64 which is capable of electronically identifying a desired tool-pallet (40–60) combination. The reader 64 is mounted on a shuttle support member 66, which slides on the column ways 32 in a position spaced slightly above the spindle housing 30. The shuttle support member 66 has an integral nut which is engaged by the vertical lead screw 34 so that it moves synchronously with the spindle housing 30 and has a fixed spacing to the spindle housing, but is supported independently of the spindle housing. The shuttle support member 66 has guideways in the form of a pair of parallel vertically spaced bars 70. A horizontal lead screw 71 is also mounted on the shuttle support member 66 and functions to move a shuttle 72 along the bars 70, a direction which is parallel to the axis of the spindle 36. The shuttle 72 serves to transport a selected tool-pallet 40–60 from the tool storage device 62 to a position adjacent the forward end of the shuttle support member 66. From this location the selected tool-pallet combination is removed from the shuttle 72 and delivered to the spindle 36 by an interchange arm 74. The interchange arm 74 also serves to return a used tool-pallet combination from the spindle 36. After a tool 40 is inserted into the spindle 36, its pallet 60 is disengaged from said tool by means of a jaw actuating mechanism 76 (FIGS. 10 and 11). The pallets 60, the tool storage device 62, the shuttle support member 66 and the parts supported on it, and the actuating mechanism 76 will all be separately described. Finally, the various hydraulic and electrical devices which move and control the movement of the various parts of the tool changing mechanism will be described at the same time that the operation of the tool changing mechanism is described.

THE PALLET

The pallet or carrier 60 comprises a sheet metal plate 78 having a central rectangular opening 80 (FIG. 15). The plate 78 is provided with stiffening flanges 82 along its opposite sides as well as stiffening flanges 84 around the opening 80. A pair of sheet metal jaw housings 86 are welded to one side of the plate 78 in alignment with one another and on opposite sides of the opening 80. A pair of jaws 88a and 88b are positioned within the jaw housings 86. Each of the jaws 88a and 88b is provided with a pair of bores 90 extending transversely therethrough. A separate coil spring 92 is positioned in each bore 90, as are a pair of ball detents 94. The jaw housings 86 guide the jaws 88a and 88b for diametrically opposite movement toward and away from the center of the opening 80. Each jaw housing is provided with two pairs of slots 96a and 96b of a width slightly less than the diameter of the balls 94. As shown in FIG. 3, the balls 94 of the jaws 88 are only disposed in the slots 96b. The balls 94 thus serve to hold the jaws 88a and 88b in the open position. When the jaws 88a and 88b are closed, the balls 94 will lie in the slots 96a and 96b, thereby holding the jaws closed. The inner surface of each jaw 88a and 88b is provided with a transverse cam slot 98. The cam slots 98 cooperate with a portion of the jaw actuating mechanism 76 to accomplish the opening and closing of the jaws.

Each pallet 60 is provided with what may be generally described as "handle means" in the form of a pair of pins 100. The pins 100 pass through and are welded to the plate 78. Each pin 100 has a flange 102 engaging the plate and a pair of detent grooves 104 and 106 adjacent its opposite ends. An access opening 108 is formed in the plate 78 between the pins 100. Tool identification coding means 110 is secured to the plate in a location adjacent one end thereof. The coding means 110 includes a bolt 112 disposed at right angles to the plate 78 and having a stack of interchangeable rings 114a and 114b stacked along its length. A fixed conductive ring 115 is located at one end of this stack. The rings 114a are electrically conductive while the rings 114b are electrically non-conductive rings. The rings 114a and 114b are held on the bolt 112 by a nut 116.

Tool identification is accomplished by sensing the electrical conductivity of the ring 114a or 114b in each ring location, as will be more fully explained in connection with "The Tool Selection Mechanism."

A tool length coding device is mounted upon the plate 78 as indicated at 118 (FIGS. 15 and 18). The coding device 118 includes six rotary cams 120 mounted on a shaft 122 secured to the plate 78. The cams are positioned within an opening 124 of the plate. Each cam 120 has a circular thumb wheel portion 120a bearing 10 equally spaced numerals from 0 to 9. Spaced along the length of each cam 120 are four circular cam tracks 120b. Five recesses 120c are spaced equally about the inner periphery of each cam 120. The shaft 122 has six parallel axially spaced holes 121 drilled therethrough in alignment with the cam recesses 120c. A pair of ball detents 123 are positioned in each hole 121 and are biased against the adjacent cams 120 by a spring 125. By this means 10 separate positions are established for each cam 120, with one ball 123 snapping into one recess 120c for each position of a cam. Each of such positions is identified by a digit on the cam portion 120a. Each cam is used to dial in one digit of the axial dimension of a tool. Two cams 120 are used for digits to the left of the decimal point. Thus, tool lengths up to 99.9999 inches may be dialed in on each pallet 60. Before each tool-pallet 40–60 is positioned in the storage device 62, the length of the tool is accurately measured and the length is dialed into the coding device 118.

The jaws 88a and 88b are effective to engage and grip a tool 40 by the provision of the tool engaging projections on the jaws. Such projections include a pair of projections 126 on the jaws 88b and a single projection 128 on the jaw 88a. Except for the difference between the projections 126 and 128, the two jaws 88a and 88b are identical to one another. The projections 126 are conformably received in the tool opening 50 while the projection 128 is conformably received in the tool opening 52. With jaws 88a and 88b closed, a tool 40 is thus securely clamped to a pallet 60.

TOOL STORAGE DEVICE

The machine of the present invention is designed to support a plurality of tool-pallet (40–60) combinations in the tool storage device 62. The device 62 includes a chain 130 having a plurality of socket members 132 pivotally connected by links 134 and screws 136 (FIGS. 2–4). The screws 136 also serve to affix cogs 138 to the rear sides of the socket members 132. The chain 130 extends around and is supported between a drive sprocket 140 and an idler sprocket 142. The sprockets 140 and 142 are provided with semi-circular recesses 144 which receive the cogs 138. The drive sprocket 140 is driven by a motor 135 through a pinion 137 meshing with a large spur gear 139 fastened to the drive sprocket. Pairs of rails 146 extend between the sprockets 140 and 142 on opposite sides of the chain 130 and are received in grooves 148 on opposite sides of the socket members 132 to maintain the desired alignment of the chain. The rails 146 are fastened to a supporting framework 149 which also provides hubs 151 in which sprocket shafts 155 are journalled.

The portions of the chain 130 which carry the tool-pallet combination are the socket members 132. The construction of the socket members is best seen by reference to FIG. 3. Each socket member 132 will be seen to have a bore 150 provided with a reduced diameter portion 152 at its rear end. The forward and rear portions of the tool shank 42 are thus engaged and supported. A plastic O-ring 153 is provided adjacent the forward end of the bore 150 to prevent excessive bumping and possible damage to the tool shank 42. Each pallet-tool combination is held onto a socket member 132 by means of two pairs of latches 154 disposed on opposite sides of the pallet. The latches 154 are pivoted on the socket members 132 and are biased by spring 156 and plungers 158 to a position in which they hold the pallet 60 against the front face 160 of its socket member 132. The latches 154 have cam surfaces 162 which engage edges 164 of the pallet to permit a pallet-tool combination to be pushed straight into a socket member 132, spreading the latches 154 apart so that they snap over and engage the front face 166 of the pallet. The latches 154 of each pair lie on opposite sides of one of the jaw housings 86. Each pair of latches 154 is connected by cross members 168. The cross members 168 project laterally outwardly of the jaw housings 86 to readily accessible positions.

SHUTTLE SUPPORT AND ASSOCIATED STRUCTURE

The shuttle support member 66 serves principally to support the shuttle 72 for movement in a direction parallel to the axis of the drive spindle 36. The shuttle 72 is provided with integral bearing portions 184 which engage the guide bars 70 and encircle approximately 300° of the circumference of each bar (FIG. 6). The bearing portions 184 have clearance recesses 183 to permit the bearing portions 184 to move past brackets 185 by which the bars 70 are supported on shuttle support member 66. The shuttle 72 is also provided with an integral nut portion 186 which threadably receives the lead screw 71.

The construction of the shuttle 72 is best seen in FIGS. 6, 7 and 8. Looking first at FIG. 8 it will be seen that the shuttle 72 is formed with a pair of parallel bores 170 which are open to its forward end. The bores 170 conformably receive the pallet pins 100, the ends of the pins 100 being chamfered to facilitate their entry into the bores 170. Formed in the shuttle 72 between the bores 170 is a central guide passage 172 which extends from the forward end of the shuttle to a cylinder bore 174. A pair of coaxial guide openings 176 extend from the central guide bore 172 in oppositely outward directions to the bores 170. The guide openings are preferably formed by drilling the shuttle 72 and then closing one end of the drilled opening with a plug 178. A pair of detents 180 are slidably guided within the guide openings 176 and are provided with rotatable end portions in the form of captured balls 182.

The shuttle 72 is provided with additional internal openings in the form of a pair of coaxial cylinder bores 188 which receive a pair of pistons 190. The pistons 190 carry actuating rods 192 which pass through guides 194 and are engageable with the cross members 168. The pistons 190 are biased to a retracted position by coil springs 196 and washers 197 surrounding the actuating rods 192. The springs 196 are seated against the guides 194. The bores 188 are designed to be pressurized through passage means 198 to cause the pistons 190 to move outwardly against the springs 196 until the washers 197 abut the ends of the guides 194. When this is done the latches 152 and 154 are opened to release the selected tool-pallet combination for movement out of the tool storage device 62.

The actuating structure for the detents 180 includes a piston 200 having a plunger portion 202 provided with a conical cam surface 204 at its forward end. A rod 206 is slidably supported within the plunger and is biased to a forward position therein by a spring 208 captured within the plunger. An indicating rod 210 projects rearwardly from the piston 200 and is fixed with respect to the piston 200. The indicating rod extends outwardly of the shuttle 72 and serves to actuate limit switches which will be hereinafter described.

The shuttle support member 66 is formed at its forward end with plain bearings 212 supporting and guiding a pair of guide bars 214 (FIG. 14). The guide bars 214 are rigidly secured to a journal housing 216. The journal housing 216 provides bearings 218 which rotatably support the pivot shaft 220 of the interchange arm 74. A cylinder housing 224 is affixed to the shuttle support member 66 and has a piston rod 226 which is fastened to the journal housing 216. When hydraulic fluid is delivered to the cylinder 224, axial movement of the journal housing 216 is effected with the guide bars 214 sliding in the bearings 212.

The journal housing 216 is formed with a cylinder bore 228 containing a piston 230 carrying a rack 232 (FIG. 10). The rack 232 meshes with a pinion 234 keyed to the shaft 220. By reciprocating the piston 230 under hydraulic pressure, 180° rotation of the interchange arm 74 is accomplished.

The opposite ends of the interchange arm 74 are identical and a description of one end of said arm will suffice to describe both ends. For this purpose reference may be made to FIG. 8. The end of the interchange arm 74 will be seen to have a pair of parallel bores 236 which are sized and positioned to conformably receive the pallet pins 100. The bores 236 extend transversely across the interchange arm and are spaced on opposite sides of a central stepped bore 238. A tapered plug 240 is positioned in the bore 238 and is spring biased to the position shown in FIG. 8 by a coil spring 242. The plug 240 projects from the rear side of the interchange arm 74 and is designed to pass through the opening 80 of a pallet 60 and into the left hand end of the opening 172 of the shuttle 72. The plug 240 serves to activate a pair of elongated cylindrical detents 244 which are positioned within drilled holes 246 extending longitudinally of the interchange arm 74. The detents are provided with rotatable end portions in the form of captured balls 248. The plug 240 has a large diameter portion 250 which is connected to a smaller portion of the plug through a conical surface 252. When the spring 242 is permitted to bias the plug 240 to the position illustrated in FIG. 8, the plug large diameter portion 250 will hold the detents 244 within the grooves 106 of the pins 100, thus locking the interchange arm 222 and pallet together. Tool-pallet combinations are designed to be delivered from the shuttle 72 to the spindle 36, by the interchange arm 74. For this purpose the interchange arm 74 is first moved axially forward, rotated 180° and then axially retracted.

JAW ACTUATING MECHANISM

Once a tool-pallet combination has been delivered to the spindle 36 and the tool shank 42 inserted in the spindle by retraction of the interchange arm 74, the tool 40 is uncoupled from its pallet 60. The uncoupling is accomplished through what has been generally described as a jaw actuating mechanism 76. The mechanism 76 includes a special nose piece 254 for the spindle housing 30. The nose piece 254 is formed with a cylinder bore 256 (FIG. 12) containing a piston 258. A piston rod 260 carried by the piston 258 is formed with a rack 262 meshing with a pinion 264. The rack is guided for movement within the special nose piece 254 while the pinion 264 is journalled for rotation therein. As shown in FIG. 11, the pinion 264 has elongated teeth that it also meshes with the teeth of an internal ring gear 266. The ring gear 266 is coaxial with and surrounds the drive spindle 36. The ring gear 266 meshes with gear teeth 268 of cylindrical members 270 journalled within bores 272 of the nose piece 254. The cylindrical members 270 have eccentric pin portions 274 which snugly fit within the slots 98 of the pallet jaws 88a and 88b. As shown in FIG. 10, when the pin portions 274 are spaced widely apart, the jaws 88a and 88b are open. However, when the cylindrical members 270 are rotated through arcs of 180°, the eccentric pin portions 274 will be brought closer together to close the jaws 88. It will be noted that the jaw ball detent 94 will hold the jaws 88a and 88b in either the open or closed position.

Mounted on the nose piece 254 is a special electronic reader 276 which is shown in FIGS. 10 and 13. The reader 276 is provided with 24 switches 278 each of which is actuated by one of the cam tracks 120b a slidable pin 280. Depending upon the position of its adjacent cam 120, the contacts of each switch 278 will be either open or closed. By this means a binary coding system is established with a different combination of switch positions used for each position of a cam 120.

THE TOOL SELECTION MECHANISM

The entire tool storage device 62 is positioned adjacent to the spindle housing 30 and support member 66. The tool identification reader 64 is mounted on the shuttle support member 66 and is provided with twenty-one electrically conductive sensing wires 282 which are parallel to the adjacent path of movement of the chain 130 and are designed to make contact with each of the coding rings 114a, 114b and 115. The reader 64 is thus able to sense the electrical conductivity of the ring 114a or 114b in the position of each wire 282. It will be noted that twenty rings 114a and 114b are used. These rings are arranged in groups of four. By the use of binary coding, five digits can be programmed on the bolt 112. Thus separate numbers could be assigned to 99,999 different tools. The electrically conductive rings 114a will complete a circuit from the reader wires 282 through the bolt 112 and permanent ring 115. This is sensed by the reader 64 which is thus able to read the number of each tool-pallet 40–60. Of course, each tool-pallet is given a different number.

The reader 64 cooperates with a resolver 284 to slave the chain 130 to the shuttle support member 66 and maintain a predetermined positional relationship between the shuttle support member 66 and a selected tool 40. Looking at FIG. 6, it will be seen that finger 286 is positioned in vertical alignment with abutment members 288 which are positioned one on each socket member 132. The finger 286 is connected to a piston 290 (FIG. 17) of a cylinder housing 292. The cylinder housing 292 is fixed to one end of a pivoting shaft 294 journalled within a support member 296 fixed to the shuttle support member 66. The opposite end of the shaft 294 is coupled to the resolver 284 so that the rotor of the resolver 284 assumes an angular position corresponding with the angular position of the housing 292. The housing 292 is spring biased to an upward position while the chain normally moves downwardly. Accordingly, when the finger 286 is projected so as to be contacted by an abutment 288, the abutment will cause the housing 292 to pivot and bring the resolver to a null position. Such a null position of the resolver is sensed by a controller 298, which in turn controls the motor 135 that turns the drive sprocket 140 of the tool storage device 62.

The resolver 284 delivers a signal to the controller 298 indicating which side of the null position its rotor is located on. The controller controls the delivery of current to the motor 135 to drive the motor 135 in a direction causing the resolver rotor to approach its null point. When the resolver rotor is in its null point no current is delivered to the motor 135.

OPERATION AND HYDRAULIC AND ELECTRICAL COMPONENTS

The mechanism of the present invention includes various electrical and hydraulic components which furnish the power to move the mechanical parts or to control such movement. These components are best described during a narrative description of the operation of the tool changing mechanism. The electrical circuitry by which the various electrical parts are energized must, of course, be integrated with the electrical control circuitry for the particular machine on which the tool changing mechanism is installed. The design of such electrical circuitry is well within the skill of electrical engineers operating in the machine tool industry when given the hydraulic and electrical components and their desired function. Varying electrical circuits can be designed for any particular machine tool and the particular electrical circuitry which might be utilized does not comprise a part of the present invention.

Power for operating certain parts of the tool changing mechanism comes from an hydraulic system having a pump P. The pump P is run continuously to deliver fluid pressure to a plurality of valves 304, 306, 308, 310, 312, 314, 316, 318 and 320. The valve 306 controls the direction of operation of an hydraulic motor 302, which rotates the shuttle lead screw 71. The valve 306 is shown in an "off" position in which no fluid is delivered to the motor 302. However, alternative energization of solenoids SOL 2 or SOL 3 will shift the valve 306 to either "forward" or "reverse" positions. The speed of operation of the motor 302 is controlled by the valve 304, which is operated by a solenoid SOL 1. Fluid flowing from the motor 302 to a reservoir 322 is directed through the valve 304. When the solenoid SOL 1 is energized the valve 304 will by-pass such fluid around a restriction 324 which normally slows down the rate of flow and thereby causes the motor 302 to operate at slow speed.

The operation of the tool changing mechanism will be described beginning with the shuttle 72 in a retracted position R (FIG. 5). In this position a finger 189 (FIG. 19) on the shuttle 72 actuates a limit switch LS 1. The solenoid SOL 3 is energized to drive the motor 302 in a direction in which the shuttle is held against a fixed stop 71b at the rear end of the lead screw 71. The shuttle 72 is thus maintained in a position rearwardly of the tool-pallets 40–60 on the chain 130. The chain motor 143 is driven to move the tool-pallets 40–60 past the reader 64 on the shuttle support member 66. The reader contacts the coding rings 114 on each pallet 60 and delivers a corresponding signal to the controller 298. When the controller receives a signal corresponding to the tool called for in the next machining operation, solenoid SOL 6 is energized to cause the valve 312 to vent the cylinder housing 292 to the reservoir 322. The spring 291 is thereby permitted to extend the finger 286 so that it will engage the abutment 288 of the socket member 132 in which the selected tool is positioned. The engagement of such abutment 288 with the finger 286 will rotate the rotor of the resolver 284 until the resolver delivers a "null" signal to the controller 298. When his happens, the chain motor 135 is slaved to keep the resolver 284 in a null producing condition, moving the selected tool either up or down in accordance with the subsequent movement of the shuttle support member 66.

When the resolver "null" position is achieved, the controller is effective to energize SOL 2 to produce forward movement of the shuttle 72 from the retracted position R to a "chain" position C in which the pallet pins 100 enter the shuttle bores 170. At this point the shuttle finger 189 will actuate a limit switch LS 2 and the abutment 191 on the shuttle will abut the retractable stop 193. The motor 302 is simply stalled with the shuttle 72 held in this position by the stop 193. The actuation of LS 2 will, after a time delay, cause energization of the solenoid SOL 5 and operate the valve 310 to pressurize the bores 174 and 188. The piston 200 is thereby advanced to move the detents 244 outwardly and lock the shuttle to the selected tool. The pistons 190 are also moved outwardly to cause the rods 192 to unlatch the selected tool-pallet 40–60 from its socket member 132. When the extension arm 210 has cleared the limit switch LS 11, the solenoid SOL 4 will be de-energized after a time delay to cause the valve 308 to deliver hydraulic fluid to the bore 197 in a direction which will raise the stop 193 and permit the motor 302 to continue the forward movement of the shuttle 72. When the shuttle arrives at a position in which its finger actuates limit switch LS 3, solenoid SOL 2 is de-energized to return the valve 306 to an off position and thereby stop the shuttle in what may be called a park position P.

The shuttle remains in the park position P until the machining operation which is in progress is completed and a signal is delivered by the controller 298 indicating that the machine is ready for the removal of the used tool 40 and the installation of the tool 40 which is in the park position P. This signal is not permitted to initiate the actual tool change function until the spindle 36 has been fully retracted to actuate a limit switch LS 13 (FIG. 20) and the spindle has been angularly oriented to actuate a limit switch (not shown) located within the thrust housing 37. Furthermore, a limit switch LS 14 must be actuated by complete retraction of the table 26 away from the spindle 36. The full retraction of the table 26 assures that the tool 40 will not interfere with a workpiece W which is shown as resting on the table 26 in FIG. 20. When said limit switches are actuated and the controller calls for a tool change the solenoid SOL 2 is energized to initiate forward shuttle movement, which continues until the shuttle 72 abuts a fixed stop 71a at the forward end of the lead screw 71 and the motor 302 is stalled. The finger 189 will then actuate limit switch LS 4. The shuttle 72 is now stopped in what may be called a forward position F.

When the shuttle 72 moves into the forward position F, the forward ends of the pallet pins 100 will enter a pair of bores 236 of the interchange arm 74. At the same time the rod 206 of the shuttle 72 contacts the end of the plug 240 and pushes it against the spring 242 to let the detents 244 move inwardly. For this purpose, the spring 208 is made stronger than the spring 242. However, should the shuttle 72 continue a forward movement after the plug 240 has been moved back as far as it can go, the spring 208 will collapse to permit such shuttle over-travel without damage to any parts of the mechanism. Following a time delay after actuation of limit switch LS 4, solenoid SOL 5 is de-energized to effect retraction of the piston 200 and thereby unlock the pallet 60 from the shuttle 72 and permit the plug 240 to move the detents 244 outwardly. The selected tool-pallet 40-60 is thus transferred and locked to the interchange arm 74.

The uncoupling of a tool-pallet 40-60 from the shuttle 72 is sensed through engagement of the limit switch LS 12 by the rod 210. This is effective to energize solenoid SOL 11 and move the valve 316 to a position in which it directs hydraulic fluid to the rear end of the cylinder housing 224. This is effective to move the piston 226 forward, causing the journal housing 216 and interchange arm 74 to move forward as guided by the rods 214. This withdraws the pallet-tool 40-60 from the shuttle 72. It also withdraws the used tool-pallet 40-60 from the spindle 36. When the interchange arm 74 is fully forward the limit switch LS 6 will be closed. When this happens, a solenoid SOL 13 in energized. This moves the valve 318 to a position directing fluid to the upper end of the bore 228. This moves the piston 230 downwardly and rotates the interchange arm 180°. When the piston is fully down, the rod 231 will clear limit switch LS 8. This is effective to energize solenoid SOL 10 and de-energize SOL 11. This causes retraction of the interchange arm 74 with consequent insertion of the new tool in the spindle 36. The arrival of the tool in this position is signalled by actuation of limit switch LS 5. At this time a conventional power draw bolt (not shown) is operated to lock the tool 40 to the spindle 36. When this is accomplished a solenoid SOL 8 is energized to move valve 314 to a position directing fluid to the upper end of bore 256. This causes downward movement of the piston 258 and consequent rotational movement of the cylindrical members 270. The eccentrics 274, which lie within the pallet jaw slots 98 are thus moved outwardly. This opens the jaws 88a and 88b to uncouple the selected tool 40 from its pallet 60. During a machining operation the spindle 36 advances through the pallet opening 80. The pallet 60 of the tool 40 being used is held adjacent the front end of the spindle sleeve 38 during the machining operation and does not move again until its tool 40 is recoupled to it. In this position, the coding cams 120 actuate the switches 278, causing the reader 276 to deliver a signal to the controller indicating the length of the tool 40 being used. This information is used in several ways. It not only determines the distance the tool 40 will be advanced in an axial direction, but it also controls the positioning of the table 26 along its lead screw 25.

The controller will use the tool length information it receives from the reader 276 to compute an "optimum" axial position for the table 26. The table lead screw 25 is geared to a multiple rotary resolver position feed back unit 326 which is connected to the controller and whereby the controller can sense table position. It is desirable to bring the table 26 as close to the spindle 36 as possible to minimize spindle "over hang." However, the longer the tool being used, the farther away from the spindle the table will have to be positioned to provide the necessary tool clearance. Accordingly, after a new tool 40 is inserted into the spindle 36, the motor 29 is operated to move the table 26 toward the spindle. When the feed back unit 326 tells the controller that the optimum position has been reached, a solenoid SOL 14 is de-energized to permit the valve 320 to evacuate hydraulic fluid from a bore 330 and thus allow retraction of a plunger 332. This releases a pawl 334 for movement into contact with a ratchet 338 under influence of a spring 336. The ratchet 338 has rather widely spaced teeth and the timing of the release of the pawl 334 determines the ratchet tooth against which the table will be positioned. The table is clamped in this position by conventional clamps (not shown) and after a short time delay the motor 29 is de-energized. The controller knows where the table 26 (and thus the workpiece W) is positioned and the programmed depth of cut for that machining operation is made from that position.

When the machining operation is completed, the spindle 36 is retracted and angularly oriented in the predetermined position at which it accepted the tool 40. The jaws 88a and 88b are then closed. This signals that the spindle 36 is ready for a new tool and the previously described tool changing function is repeated. When the used tool is inserted in the shuttle 72, the plunger 202 is in a retracted position. Thus, the detents 180 can be pushed inwardly by the pins 100 when they enter the bores 170. The engagement of the limit switch LS 5 causes the energization of solenoid SOL 5 and consequent relocking of the used pallet 60 to the shuttle 72. The forward movement of the plunger 202 is, of course, effective to unlock the used pallet 60 from the interchange arm 74 as its rod 206 pushes the wide diameter plug portion 250 out of the way of the detents 244.

The shuttle returns the used tool 40 to the socket 132 from which the new tool 40 was taken, the chain 130 remaining slaved to the shuttle support member 66 following the removal of the new tool 40 from the chain. For this purpose, the edges of the pallet 60 engage the cam surfaces 162 of the latches 154 to spread the latches apart until they snap over the pallet 60 and lock it to the socket member 132. The reverse movement of the shuttle to this position C from the position P was signaled by the release of limit switch LS 11. The further movement of the shuttle 72 to the retracted position R is signaled by actuation of LS 12 following uncoupling of the shuttle 72 from the used pallet 60 after the used tool-pallet 40–60 has been reinserted in the chain 130 in position C. It will be noted that the shuttle abutment 191 pivots to either of two different positions so that the position of the shuttle at position C is the same irrespective of the direction from which it approached this position. The final return of the shuttle to position R will cause energization of solenoid SOL 7 to retract the resolver finger 286 and permit the reader 64 to search for the next tool called for in the machining sequence.

Whenever any of the limit switches LS 1, LS 2, LS 3 and LS 4 are actuated, the solenoid SOL 1 is de-energized to run the motor 302 at slow speed. Thus, the shuttle is started and stopped gradually by the insertion of a slow speed movement between the stopped condition and a faster normal speed movement.

What is claimed is:

1. An automatic tool changing machine tool including a rotary tool supporting spindle, tool storage means, a plurality of tool carriers coupled to tools to be used in said spindle, and tool gripping means on each of said carriers releasably coupling said tool carriers to their associated tools, transfer means operable to transport a selected tool and its carrier from said storage means and insert it in said spindle, and actuating means associated with said spindle for opening and closing the tool gripping means on a carrier held in a stationary position with its tool received in said spindle, whereby the tool in said spindle is disengaged from its carrier for rotation and axial movement with said spindle.

2. The structure set forth in claim 1 including tool identification means on each of said carriers and means for reading the tool identification means of said carriers to identify desired tool.

3. The structure set forth in claim 1 in which each of said tool carriers is provided with an opening receiving its tool and in which said tool gripping means is provided with portions on opposite sides of said carrier opening, said opening being of a size sufficient to permit said spindle to be advanced therethrough during a machining operation.

4. An automatic tool changing machine tool including a tool supporting spindle, a storage means for supporting a plurality of tools to be used in said spindle, a plurality of tool carriers having tool gripping means releasably coupling said carriers each to a tool having a shank to be received in said spindle, a shuttle for removing a selected tool and its carrier from said tool storage means and transporting the same toward said spindle, said carriers having first and second handle portions on axially opposite sides thereof, said shuttle being engageable with the first handle portion of a selected carrier, and an interchange arm engageable with the second handle portion of a carrier carried by said shuttle and operable to advance such carrier and its tool toward said spindle, whereby a selected tool and carrier are passed from said shuttle to said interchange arm by successive engagement of said first and second handle portions, each of said tool carriers being uncoupled from its tool prior to the performance of a machining operation with its tool whereby said carriers are not rotated by said spindle.

5. The structure set forth in claim 4, in which said interchange arm is both rotatable and movable parallel to the axis of said spindle for the purpose of inserting a selected tool into said spindle.

6. The structure set forth in claim 5, including a fluid power operated locking means on said shuttle operable to lock said first handle portion thereto.

7. The structure set forth in claim 6, including mechanically operable locking means on said interchange arm engageable with said second handle means of a carrier engaged thereby and fluid power operated means on said shuttle operable to unlock said locking means upon relative movement of said shuttle and interchange arm toward one another.

8. The structure set forth in claim 3, including mechanically operated latches on said tool storage means operable to engage said carriers and hold said carriers and their associated tools on said storage means and fluid power operated means on said shuttle operable to unlock said latches and release said carriers and tools for movement away from said tool storage means upon a given movement of said shuttle relative to said tool storage means.

9. An automatic tool changing machine tool including a tool supporting spindle, tool storage means for supporting a plurality of tools to be used in said spindle, each of said tools having a carrier releasably coupled thereto, said carrier being provided with handle means, transfer means engageable with the handle means of a selected tool for transporting said selected tool from said tool storage means to said spindle, each of said carriers having a pair of spring biased tool grippers disposed on opposite sides of a tool to which the carrier is coupled and movable toward one another into engagement with its tool and means associated with said spindle for uncoupling a tool carrier from its tool, said last name means including a pair of rotary members having eccentric projections, means journalling said members for rotation about fixed axes, an actuating gear operable to rotate said members, said projections being engageable in said tool grippers to spread said grippers apart against their biasing springs upon rotation of said actuating gear and thereby uncouple a tool for rotation free from its carrier.

10. The structure set forth in claim 1 wherein said tool carriers are provided with handle means thereon engageable by said transfer means.

11. An automatic tool changing machine tool including a rotary tool supporting spindle, tool storage means, a plurality of tool carriers having tool gripping means releasably coupling said tool carriers each to a tool having a shank to be received in said spindle said tool carriers and their associated tools being stored in said tool storage means, each of said carriers having handle means thereon, transfer means engageable with said handle means and operable in the transportation of tools and tool carriers from said tool storage means to said spindle and actuating means for opening and closing the tool gripping means on a carrier held in a stationary position with its tool received in said spindle.

12. The structure set forth in claim 11 including tool identification means on each of said carriers for identifying the tool carried thereby.

13. The structure set forth in claim 12 in which said handle means includes axially extending portions on axially opposite sides of each of said carriers.

* * * * *